United States Patent
Townshend et al.

(10) Patent No.: US 7,657,220 B2
(45) Date of Patent: Feb. 2, 2010

(54) ADAPTIVE SCORING OF RESPONSES TO CONSTRUCTED RESPONSE QUESTIONS

(75) Inventors: Brent Townshend, Menlo Park, CA (US); Jared Bernstein, Palo Alto, CA (US)

(73) Assignee: Ordinate Corporation, Menlo Park, CA (US)

( * ) Notice: Subject to any disclaimer, the term of this patent is extended or adjusted under 35 U.S.C. 154(b) by 870 days.

(21) Appl. No.: 10/851,405

(22) Filed: May 21, 2004

(65) Prior Publication Data

US 2005/0277103 A1 Dec. 15, 2005

(51) Int. Cl.
G09B 11/00 (2006.01)
(52) U.S. Cl. .................................. 434/353; 434/362
(58) Field of Classification Search .............. 434/350, 434/353, 362
See application file for complete search history.

(56) References Cited

U.S. PATENT DOCUMENTS

| | | | |
|---|---|---|---|
| 4,958,284 A | 9/1990 | Bishop et al. ............... 364/419 |
| 4,978,305 A | 12/1990 | Kraft | |
| 5,059,127 A | 10/1991 | Lewis et al. ................. 434/353 |
| 5,987,302 A | 11/1999 | Driscoll | |
| 6,115,683 A | 9/2000 | Burstein et al. ................ 704/1 |
| 6,181,909 B1 | 1/2001 | Burstein et al. ............. 434/353 |
| 6,193,521 B1 | 2/2001 | Clark | |
| 6,234,806 B1 | 5/2001 | Trenholm | |
| 6,356,864 B1 | 3/2002 | Foltz et al. ...................... 704/1 |
| 6,366,759 B1 | 4/2002 | Burstein et al. ............. 434/353 |
| 6,461,166 B1 | 10/2002 | Berman ....................... 434/323 |
| 6,577,846 B2 | 6/2003 | Poor ............................ 434/353 |
| 6,796,800 B2 | 9/2004 | Burstein et al. ............. 434/335 |
| 6,876,990 B2 | 4/2005 | Yamanishi et al. ............ 706/45 |
| 6,970,677 B2 | 11/2005 | Jongsma et al. ............. 434/353 |
| 6,996,365 B2 | 2/2006 | Okubo ......................... 434/353 |
| 7,149,468 B2 * | 12/2006 | Patz et al. .................... 434/353 |
| 2005/0142529 A1 | 6/2005 | Andreyev et al. ........... 434/362 |

OTHER PUBLICATIONS

"How ePEN Works," (Dec. 31, 2003). (www.pearsonedmeasurement.com/epen/works.htm).
"Computer Adaptive Testing Enables Accurate Skills Measurement," (Dec. 31, 2003). (www.brainbench.com/xml/bb/business/learnmore/cat.xml).

\* cited by examiner

*Primary Examiner*—Kathleen Mosser
(74) *Attorney, Agent, or Firm*—McDonnell Boehnen Hulbert & Berghoff LLP

(57) ABSTRACT

A method for adaptive scoring of responses to constructed response questions is disclosed. Adaptive scoring may be used to apply evaluator time in such a way that a predetermined reliability level is reached with the least possible use of evaluator time, including adjusting the number of response graded and/or the number of evaluators grading each response. A score may be calculated after grading a subset of a test taker's responses to the constructed response questions. A probability or an error estimate is calculated and compared to a threshold value. Grading may be discontinued based on the comparison. A score may be calculated based on a predetermined number of ratings for the test taker's response to a constructed response. A probability that the score is within a predetermined range of what the score would be if all the responses are graded is calculated. If the probability is less than a threshold value, the number of ratings is increased.

12 Claims, 7 Drawing Sheets

ADAPTIVE SCORING OF RESPONSES TO CONSTRUCTED RESPONSE QUESTIONS

FIELD

The present invention relates generally to scoring examinations, and more particularly, relates to adaptive scoring of responses to constructed response questions.

BACKGROUND

Many standardized tests require a test taker to provide a response to a constructed response question. A constructed response question may contain no response alternatives (like a multiple choice question) and require the test taker to self-generate a response, such as an essay question. For example, high school students may take Advanced Placement (AP) examinations that, if successful, may permit the student to receive college credit. As another example, law school graduates may take one or more state bar examinations to become a licensed attorney in that state. Both the AP examinations and the bar examinations may include constructive response questions, such as essay questions. Constructed response questions may also require the test taker to provide a spoken response, such as during a speech examination, or provide a pictorial response, such as during an architectural examination.

Responses to these constructed response questions are typically graded by one or more human graders or evaluators. It is important that the grading of these responses be efficient and consistent. The effort to grade the responses to constructed response questions can be enormous, especially when a question is graded by multiple evaluators. Many testing programs using constructed response questions have instituted a requirement that each question be graded by two different evaluators and the scores compared to assure that if the scores differ, the difference is within a predefined range. Scores that differ by more than the predefined range may be graded by a third evaluator to resolve the discrepancy. Alternatively, the two original evaluators may work together to resolve the discrepancy or the scores may be averaged.

Computer-based adaptive testing methods select and deliver questions to test takers based on an ongoing dynamic estimate of a test taker's performance level taken from that test taker's previous responses. For example, a test taker may receive a next question based on the test taker's response to a previous question. If the test taker answers the previous question correctly, the computer may deliver a harder question to the test taker. Conversely, if the test taker answers the previous question incorrectly, the computer may deliver an easier question to the test taker. As a result, the computer can determine the proficiency of the test taker with a fewer number of multiple choice questions than with a standard multiple choice examination.

It would be desirable to make the process of grading responses to constructed response questions more efficient without sacrificing the consistency of the scores. By using adaptive scoring to grade responses, the process of grading examinations with constructed response questions may be performed more efficiently without sacrificing consistency of the scores.

SUMMARY

A method for adaptive scoring of responses to constructed response questions is disclosed. When there are multiple constructed response questions in an examination, adaptive scoring may be used to vary the number of responses that are graded. Adaptive scoring may also be used to vary the number of evaluators grading each response.

A subset of a test taker's responses to the constructed response questions may be graded. A score may be calculated for the subset of the responses. A probability that the score is within a predetermined range of what the score would be if all the responses are graded may be calculated. If the probability is greater than a threshold value, grading may be discontinued. Alternatively, a probability that the test taker will pass an examination may be calculated. If the probability is outside a threshold range, grading may be discontinued. As another alternative, after the score is calculated for the subset of the responses, an error estimate may be calculated. If the error estimate is less than the threshold value, grading may be discontinued.

In another aspect, a test taker's responses to the constructed response questions may be graded using a predetermined number of ratings per response. Each rating for a given response may be from a different evaluator. A score may be calculated for the response based on the predetermined number of ratings. A probability that the score is within a predetermined range of what the score would be if all the responses are graded may be calculated. If the probability is less than a threshold value, the number of ratings may be increased.

As a result of using adaptive scoring of constructed response questions, the cost and/or time to grade examinations may be reduced without sacrificing consistency. The cost and/or time may be reduced as an evaluator's time is reduced by not having to grade as many responses to the constructed response questions. In addition, given a fixed budget and/or a fixed amount of evaluator time, the adaptive scoring methods may be used to apply evaluator efforts in an optimal manner for maximizing reliability and/or precision of the resultant scores reported.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Adaptive scoring may be used to increase the efficiency of grading responses to constructed response questions. The constructed response questions may be used to measure a particular skill or proficiency of a test taker. For example, the particular skill may be a legal skill, a spoken or written language skill, an architectural skill, and so on. The test taker may be a student at any level (e.g., high school student, college student, trade school student, specific skill student). The constructed response questions may include one or more essay questions, verbal response questions, pictorial response questions, and so on. The test taker may provide responses to a fixed number of constructed response questions. Each constructed response question may be graded by one or more evaluators.

I. Adaptive Scoring Overview

Figure 1:
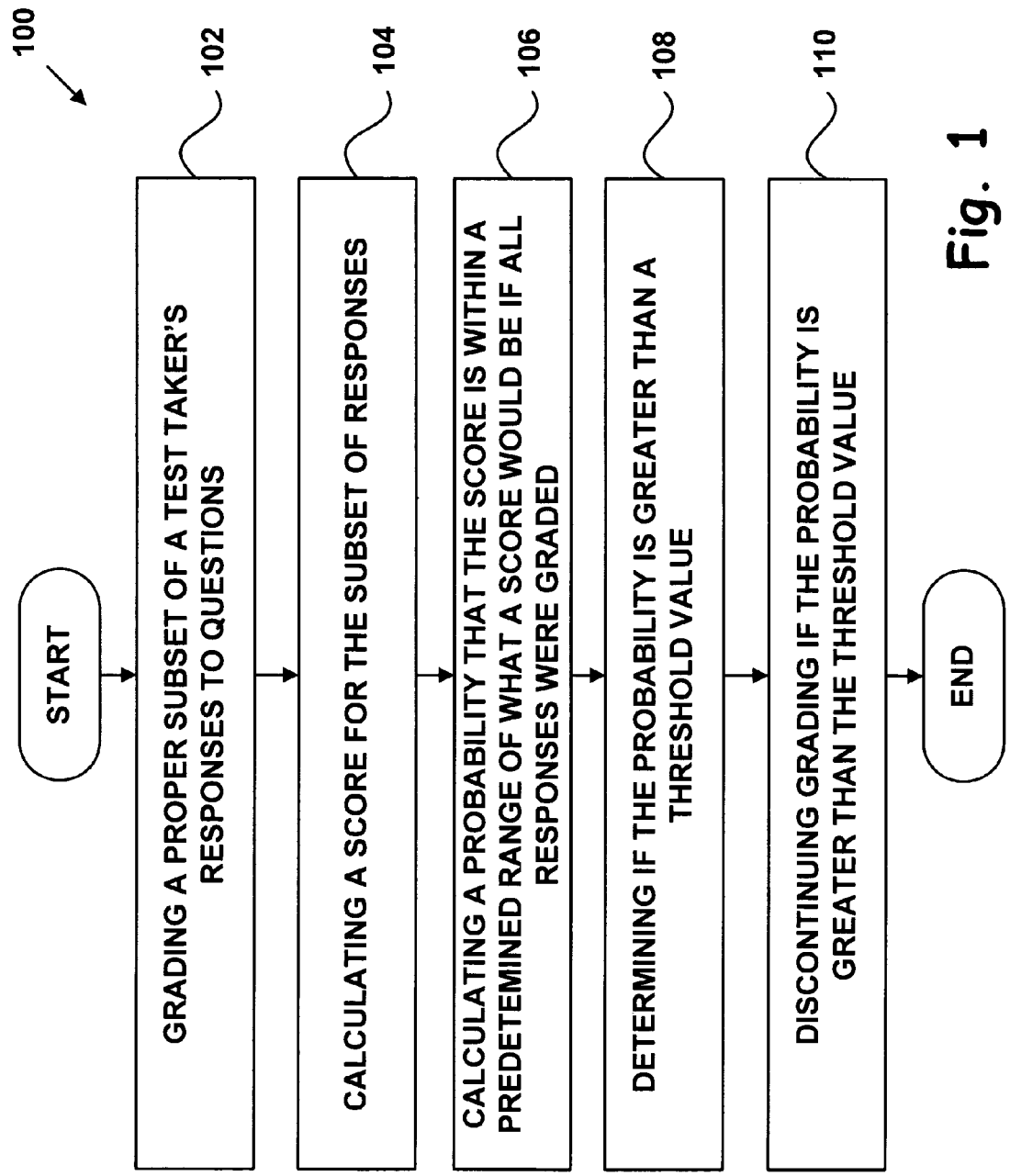
FIG. 1 is a flow diagram of a method for adaptive scoring, according to an embodiment.

FIG. 1 is a flow diagram of a method 100 for adaptive scoring. The adaptive scoring method 100 may be used to adapt the number of constructed response questions to be graded. At block 102, a subset of a test taker's response to the constructed response questions may be graded. The subset may be a proper subset as commonly known in set theory (i.e., the subset is a set that contains more than zero, but less than all of the responses). The subset of responses may be graded by one or more evaluators.

At block 104, a score is calculated for the subset of the responses. The score is calculated by the one or more evaluators. Once the score is determined, at block 106, a probability of the score being within a predetermined range of what the score would be if all the test taker's responses were graded is calculated. The probability may be calculated by computing a variance of the score. Calculating a variance is well known in the statistical arts. The predetermined range may be determined by a content expert prior to the test takers preparing responses to the constructed response questions. The term content expert herein refers to one or more people that determine how an examination is to be prepared and graded.

At block 108, the probability may be compared with a threshold value. The threshold value may be determined by the content expert prior to the test takers preparing responses to the constructed response questions. By comparing the probability with the threshold value, a determination may be made as to whether or not the probability is greater than the threshold value. At block 110, if the probability is greater than the threshold value, then grading may be discontinued. Otherwise, grading may continue.

Figure 2:
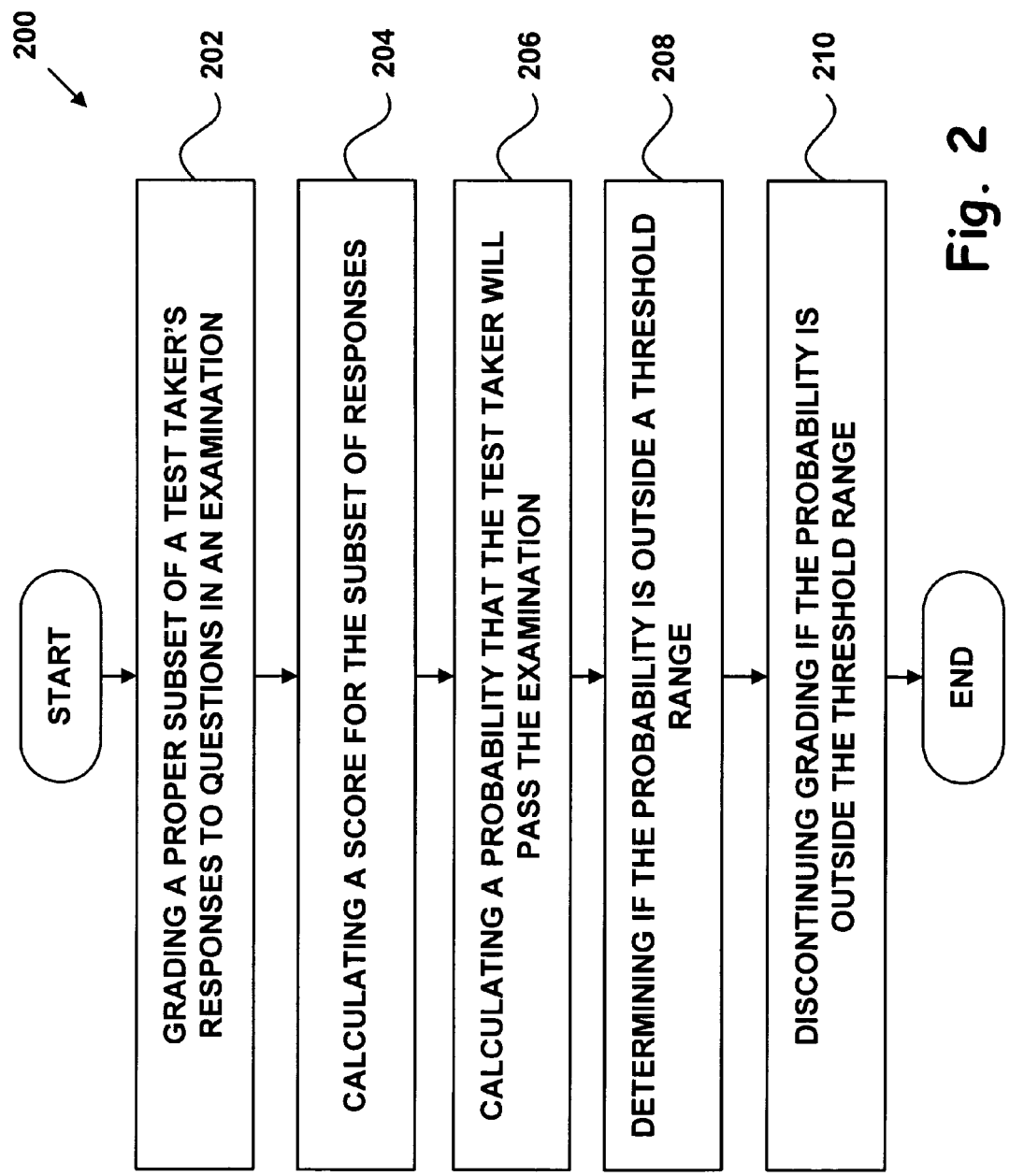
FIG. 2 is a flow diagram of a method for adaptive scoring, according to another embodiment.

FIG. 2 is a flow diagram of a method 200 for adaptive scoring. The adaptive scoring method 200 may be used to adapt the number of constructed response questions to be graded. At block 202, a subset of a test taker's response to the constructed response questions in an examination may be graded. The subset may be a proper subset as commonly known in set theory. The subset of responses may be graded by one or more evaluators.

At block 204, a score is calculated for the subset of the responses. The score is calculated by the one or more evaluators. Once the score is determined, at block 206, a probability that the test taker passed the examination is calculated. The probability may be calculated by computing an average of the scores. Calculating an average is well known in the statistical arts.

At block 208, the probability may be compared with a threshold range. The threshold range may be determined by the content expert prior to the test takers preparing responses to the constructed response questions. The threshold range may be centered at a score representing fifty percent. By comparing the probability with the threshold range, a determination may be made as to whether or not the probability is outside the threshold range. At block 210, if the probability is outside the threshold range, then grading may be discontinued. Otherwise, grading may continue.

Figure 3:
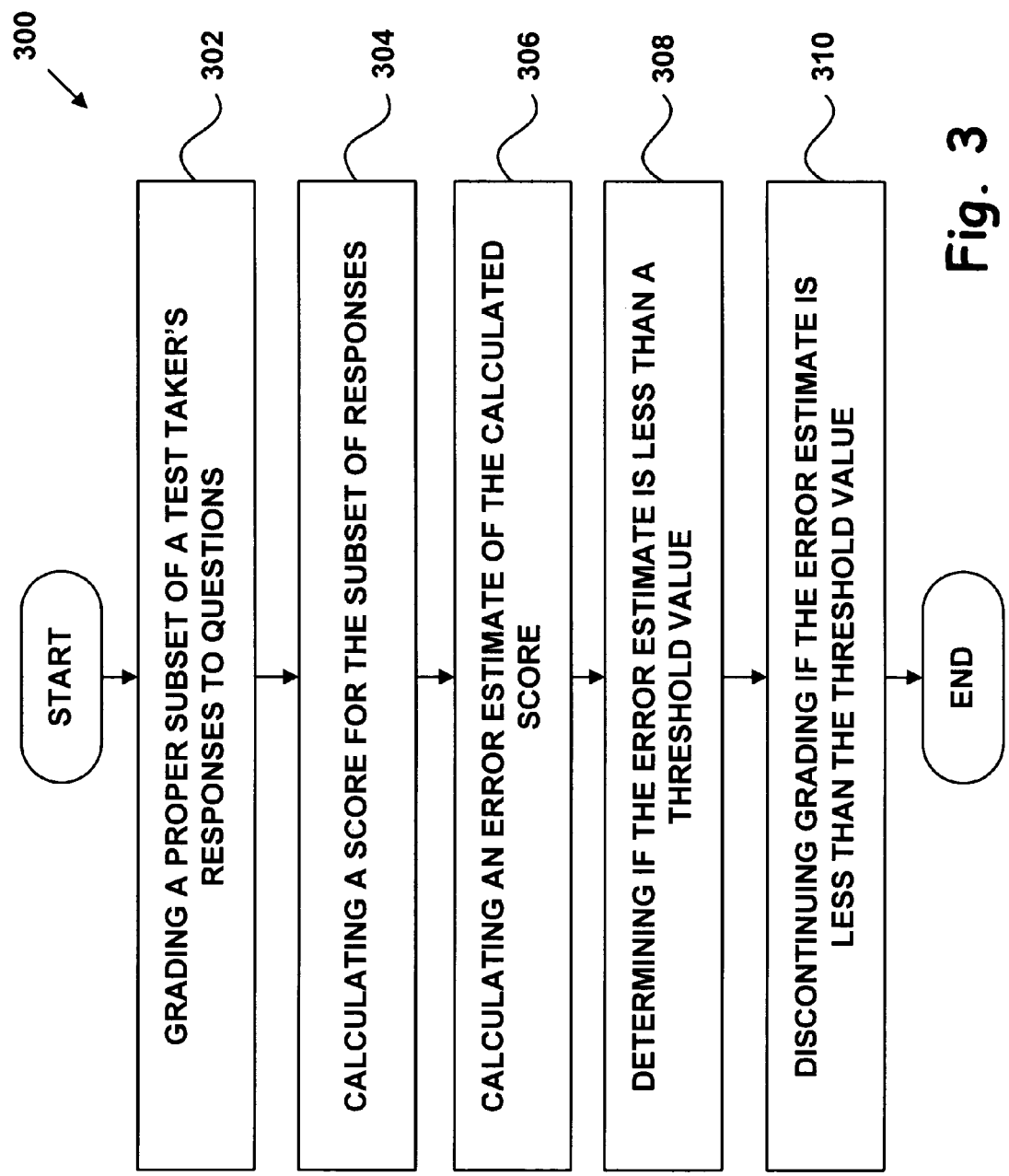
FIG. 3 is a flow diagram of a method for adaptive scoring, according to another embodiment.

FIG. 3 is a flow diagram of a method 300 for adaptive scoring. The adaptive scoring method 300 may be used to adapt the number of constructed response questions to be graded. At block 302, a subset of a test taker's response to the constructed response questions may be graded. The subset may be a proper subset as commonly known in set theory. The subset of responses may be graded by one or more evaluators.

At block 304, a score is calculated for the subset of the responses. The score is calculated by the one or more evaluators. Once the score is determined, at block 306, an error estimate of the score is calculated. The error estimate may be calculated by computing a standard deviation of the score. Calculating a standard deviation is well known in the statistical arts.

At block 308, the error estimate may be compared with a threshold value. The threshold value may be determined by the content expert prior to the test takers preparing responses to the constructed response questions. By comparing the error estimate with the threshold value, a determination may be made as to whether or not the error estimate is less than the threshold value. At block 310, if the error estimate is less than the threshold value, then grading may be discontinued. Otherwise, grading may continue.

Figure 4:
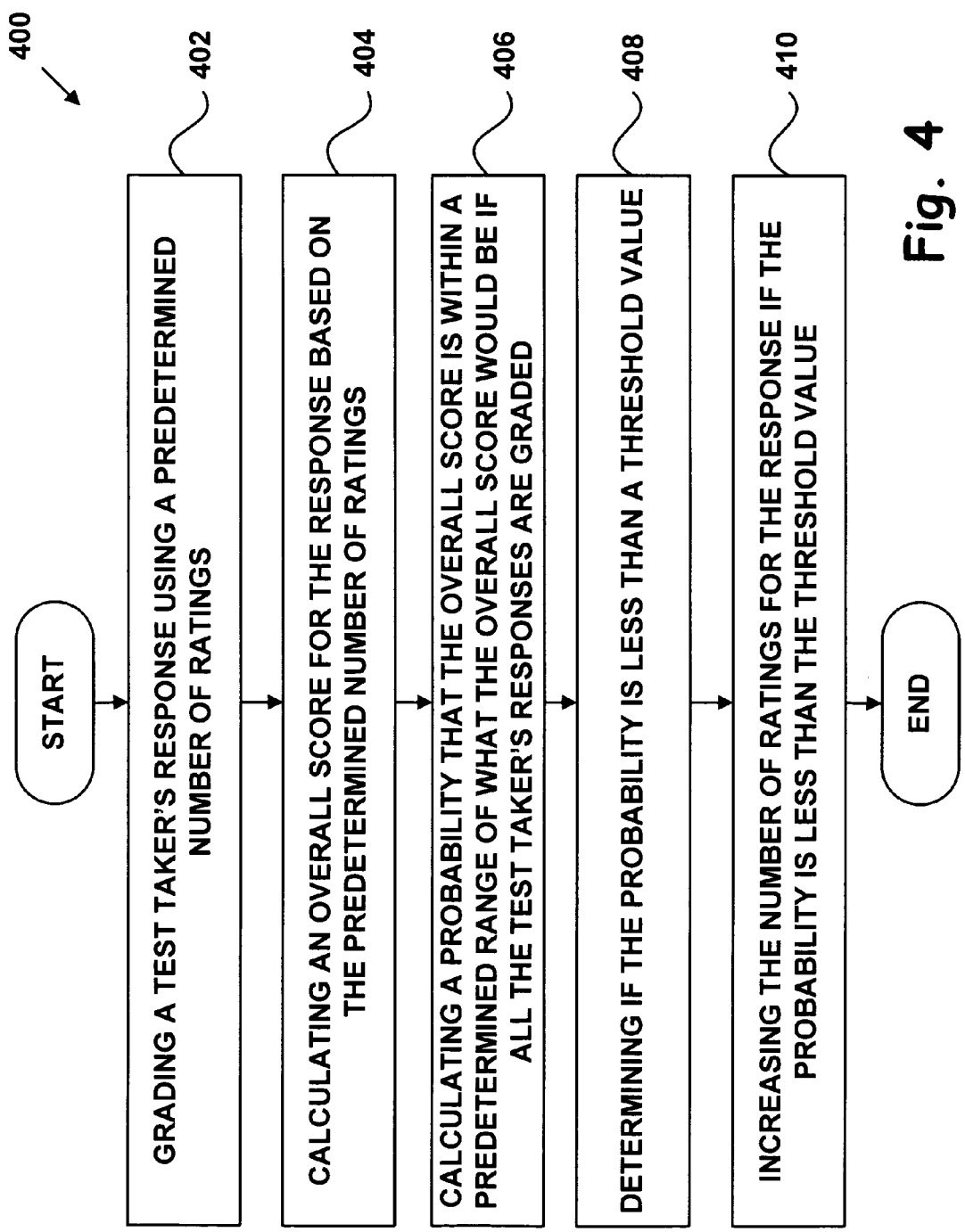
FIG. 4 is a flow diagram of a method for adaptive scoring, according to another embodiment.

FIG. 4 is a flow diagram of a method 400 for adaptive scoring. The adaptive scoring method 400 may be used to adapt the number of evaluators used to grade a response. At block 402, a test taker's response to a constructed response question may be graded using a predetermined number of ratings. Each rating may be from a different evaluator. The predetermined number of ratings may be determined by a content expert prior to the test takers preparing responses to the constructed response questions.

At block 404, an overall score is calculated for the response based on the predetermined number of ratings. The overall score may be calculated by taking an average of all the ratings. Once the score is determined, at block 406, a probability that the score is within a predetermined range of what the score would be if all the test taker's responses were graded is calculated. The probability may be calculated by computing a variance of the score. The predetermined range may be determined by the content expert prior to the test takers preparing responses to the constructed response questions.

At block 408, the probability may be compared with a threshold value. The threshold value may be determined by the content expert prior to the test takers preparing responses to the constructed response questions. By comparing the probability with the threshold value, a determination may be made as to whether or not the probability is less than the threshold value. At block 410, if the probability is less than the threshold value, then the number of ratings may be increased. Otherwise, number of ratings may remain the same or be decreased.

Alternatively, at block 406, a probability that the score is within a predetermined range of what the score would be if the responses were graded by an infinite number of raters may be calculated. The probability may be compared with the threshold value at block 408.

Figure 5:
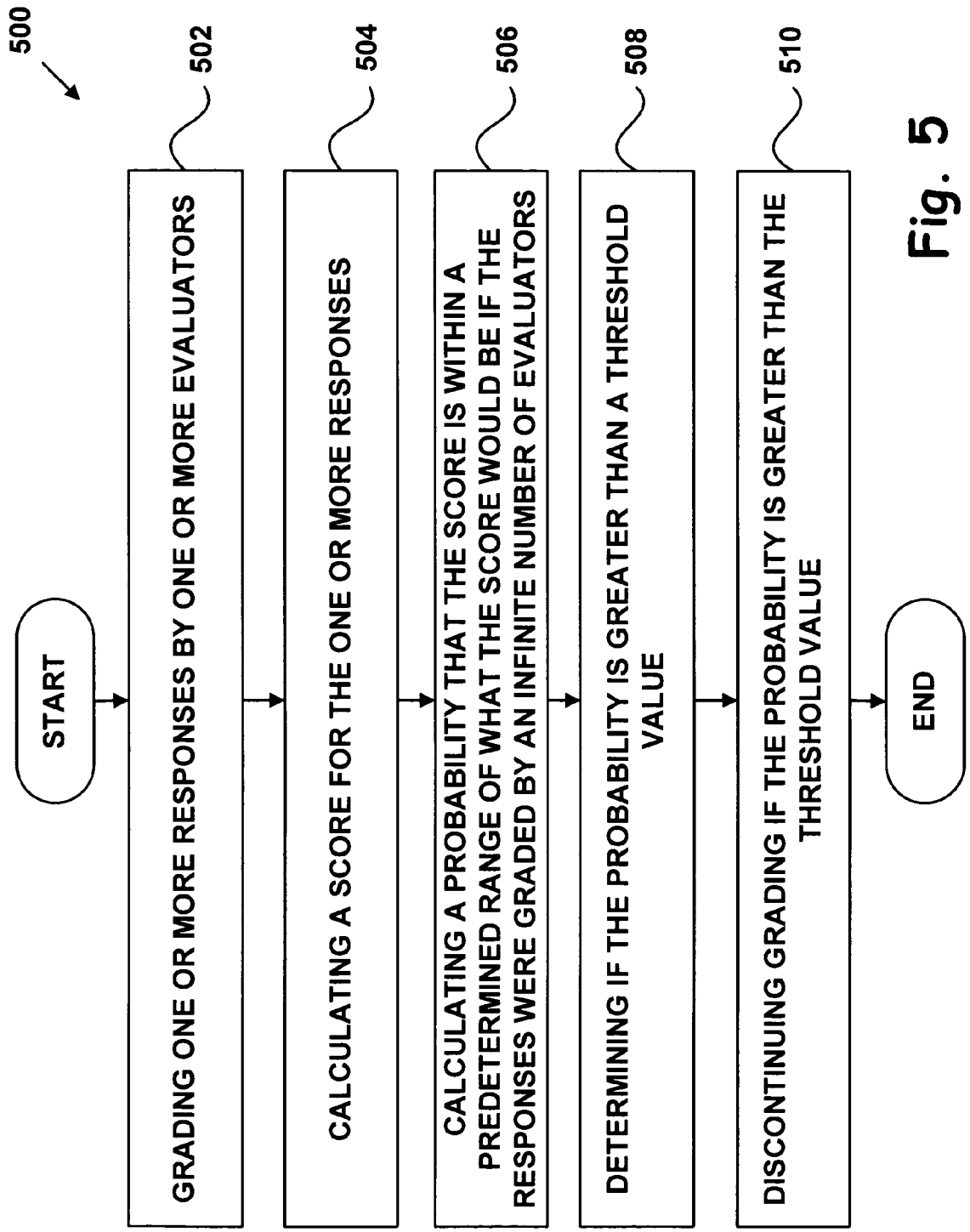
FIG. 5 is a flow diagram of a method for adaptive scoring, according to another embodiment.

FIG. 5 is a flow diagram of a method 500 for adaptive scoring. The adaptive scoring method 500 may be used to adapt the number of constructed response questions to be graded. At block 502, one or more responses to constructed response questions may be graded by one or more evaluators. At block 504, a score is calculated for the one or more responses by the one or more evaluators.

Once the score is determined, at block 506, a probability that the score is within a predetermined range of what the score would be if the one or more responses were graded by an infinite number of evaluators is calculated. The predetermined range may be determined by the content expert prior to the test takers preparing responses to the constructed response questions.

At block 508, the probability may be compared with a threshold value. The threshold value may be determined by the content expert prior to the test takers preparing responses to the constructed response questions. By comparing the probability with the threshold value, a determination may be made as to whether or not the probability is greater than the threshold value. At block 510, if the probability is greater than the threshold value, then grading may be discontinued. Otherwise, grading may continue.

The adaptive scoring methods 100-500 may be more fully understood with reference to the examples provided in the next section.

II. Examples

Figure 6:
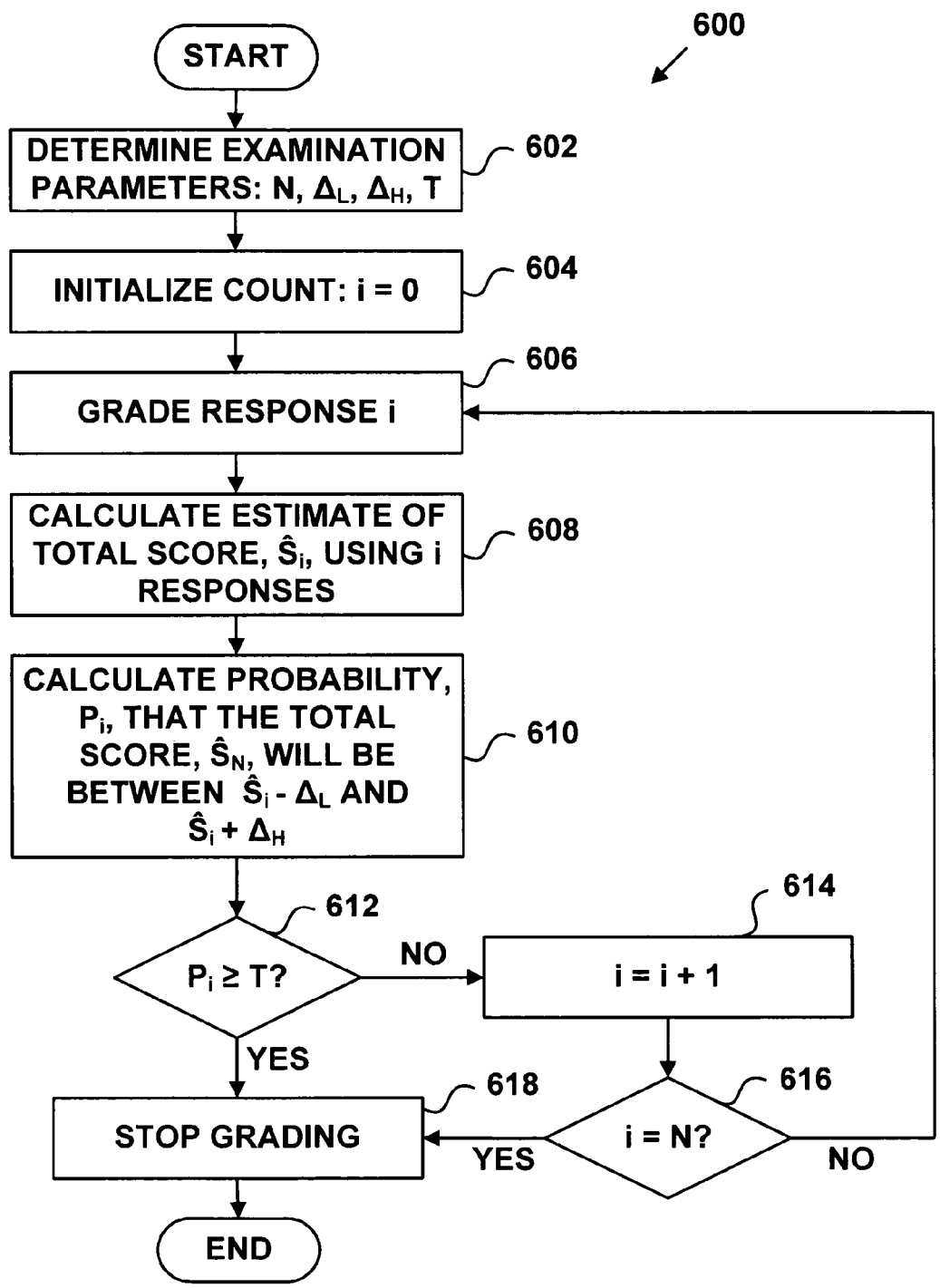
FIG. 6 is a flow diagram of a method for adaptive scoring, according to another embodiment.

FIG. 6 is a flow diagram of a method 600 for adaptive scoring. The adaptive scoring method 600 may be used to adapt the number of responses to constructed response questions to be graded. At block 602, examination parameters are determined. The examination parameters may include, for example, a total number of constructed response questions in the examination ("N"), a score range ("$\Delta_L$, $\Delta_H$"), and the threshold probability ("T"). The total number of constructed response questions in the examination N may also be referred to herein as the "number of questions."

Prior to grading the examinations, a determination is made regarding the level of certainty of the eventual outcome that is required before discontinuing grading. For example, if the score is reported on a range of 0 to 100, and the score range is +/−5 points, and T is set to 90%, then grading may be discontinued after there is a 90% certainty that the score would be within 5 points of the current estimate. The value of T may be determined by evaluating the skill being tested, the number of questions N, and the distribution of questions.

At block 604, a count variable is initialized. The count is a number of constructed response questions that have been graded ("i"). The count i may be initialized to zero. At block 606, a response to a constructed response question is graded. The response may be graded by one or more evaluators. The response is assigned a score that is representative of how well the test taker performed when answering the constructed response question.

At block 608, the score assigned to the response at block 606 is used along with all prior graded responses to compute an estimate, $\hat{S}_i$, of the total score that the test taker will get on the test. At block 610, a probability, $P_i$, that the estimated score $\hat{S}_i$ will be within a range (i.e., $\hat{S}_i - \Delta_L$, $\hat{S}_i + \Delta_H$) of the total score $\hat{S}_n$ if the entire test were graded is computed.

At block 612, the probability $P_i$ is compared to the threshold probability T for that question. If at block 612 the probability $P_i$ is equal to or above the threshold score T, then grading is discontinued at block 618 and $\hat{S}_i$ is reported as the final score. In this scenario, the test taker may obtain a score indicative of achieving competency in the skill area tested without grading all the test taker's responses.

If at block 612 the probability $P_i$ is below the threshold probability T, then at block 614, the count i is increased by one. At block 616, the count i is compared with the number of questions N. If the count i is equal to the number of questions N, at block 618 grading is discontinued. In this scenario, all the test taker's responses to the constructed response questions in the examination are graded.

At block 616, if the first count i is not equal to the number of questions N, the next response is graded at block 606. The adaptive scoring method 600 may continue in this manner until grading is discontinued when the probability $P_i$ is equal to or above the threshold score T or there are no further questions to grade (i=N).

The following is provided as an example of how the adaptive scoring method 600 may be used to efficiently grade an examination having constructed response questions. Three test takers (student A, student B, and student C) take the examination. The example describes grading student A's responses, followed by grading student B's responses, followed by grading student C's responses. The students' responses are graded sequentially in this example to highlight how the adaptive scoring method 600 may be used to effectively grade an examination. It is understood that responses for a particular question may be graded as a group (i.e., all responses to a first question are graded, followed by grading all responses to a second question, etc. . . . ).

In this example, the examination has ten constructed response questions. Prior to the students taking the examination, the content expert determines that the grading scale for each question will range from a low of zero points to a high of ten points. The total score on the test will be formed by summing the score on each question to give a possible score range of 0 to 100. The content expert may also determine that if there is a 90% certainty that a score estimate is within 10 points of the final score, then grading may be discontinued. Of course, it is not necessary that each question have the same grading scale and threshold score.

Student A's responses are graded first. The evaluator grades student A's first response and assigns a score of 8 to student A's first response. The evaluator grades student A's second response and assigns a score of 8 to student A's second response. The evaluator grades student A's third response and assigns a score of 8 to student A's third response. At this point, an expected total score of 80/100 may be calculated by averaging these scores. Furthermore, an estimate may be calculated using a statistical model that the probability that a final score with all ten questions rated would be between 70/100 and 90/100 with a probability of 92%.

Based on this estimate, the evaluator may stop grading student A's responses. As a result, the evaluator saved time and the associated costs for not having to grade all ten responses. Additionally, because it is likely that student A will continue to provide quality responses based on the proficiency shown in the first three responses, student A may receive a score that is consistent with a score obtained from grading all ten of student A's responses.

Student B's responses are graded next. The evaluator grades student B's first response and assigns a score of 8 to student B's first response. The evaluator grades student B's second response and assigns a score of 6 to student B's second response. The evaluator grades student B's third response and assigns a score of 7 to student B's third response. The evaluator grades student B's fourth response and assigns a score of 5 to student B's fourth response. The evaluator grades student B's fifth response and assigns a score of 9 to student B's fifth response. At this point, an expected total score of 70/100 may be calculated by averaging these scores. Furthermore, an estimate may be calculated using a statistical model that the probability that a final score with all ten questions rated would be between 60/100 and 80/100 with a probability of 91%.

Based on this estimate, the evaluator may stop grading student B's responses. As a result, the evaluator saved time and the associated costs for not having to grade all ten responses. Additionally, because it is likely that student B will continue to provide quality responses based on the proficiency shown in the first five responses, student B may receive a score that is consistent with a score obtained from grading all ten of student B's responses.

Student C's responses are graded next. The evaluator grades all ten responses assigning grades of 2, 7, 9, 1, 3, 5, 6, 9, 0, 4 for a total of 46/100. As the grades for student C's responses were not consistent enough to exceed the probability threshold, all the responses may be graded.

As seen in this example, the evaluator's time was spent efficiently. The evaluator spent more time grading a student's responses for a student that gave inconsistent responses and the least amount of time grading a student's responses for a student that consistently responds. Accordingly, the adaptive scoring method 600 provides an efficient method of scoring constructed response questions.

Figure 7:
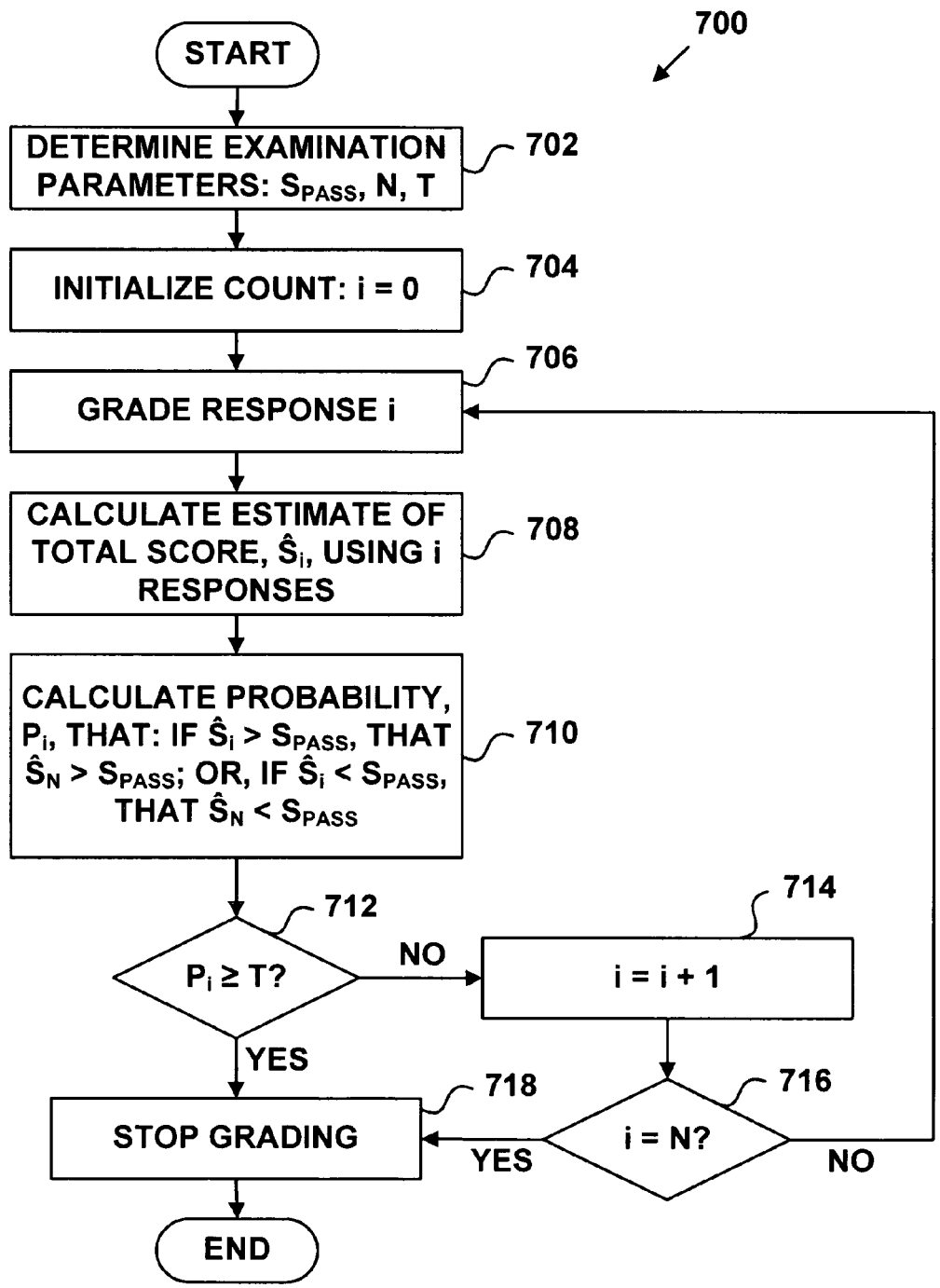
FIG. 7 is a flow diagram of a method for adaptive scoring, according to another embodiment.

FIG. 7 is a flow diagram of a method 700 for adaptive scoring. The adaptive scoring method 700 is similar to the method 600 depicted in FIG. 6 with the following difference. In step 710, instead of calculating the probability that the score is within a range of the estimated score, the calculation is the probability that a pass/fail decision is made correctly. In step 710, the probability $P_i$ that the estimated score, $\hat{S}_i$, reflects the same pass/fail decision as the final score is calculated. If the probability $P_i$ is above a threshold, T, the grading may be discontinued.

The adaptive scoring method may also be modified for more than one evaluator with multiple grades for some items. To modify the adaptive scoring method for more than one evaluator, additional scores from additional evaluators may be obtained in addition to the scores as described above. These additional scores may also be used in calculating the probabilities which are compared with the threshold.

While the above provides examples of adaptive scoring methods used to adapt the number of responses graded or the number of grades per response, it is to be understood that additional adaptive scoring methods may be developed by combining the different adaptive scoring methods. As seen above, the adaptive scoring methods provide an efficient method of grading responses to constructed response questions without sacrificing consistency. Furthermore, given a fixed budget and/or a fixed amount of evaluator time, the adaptive scoring methods may be used to apply evaluator efforts in an optimal manner for maximizing reliability and/or precision of the resultant scores reported.

The illustrated adaptive scoring methods may be implemented manually or automatically. In the automatic implementation the methods may be implemented in software running on an associated processor having an output device, such as a display or a printer, and an input device. The evaluator may enter scores using the input device and receive feedback (e.g., continue grading, discontinue grading, overall grade) via the output device. Other than the initial step of grading a response to a constructed response question, the steps of the foregoing adaptive scoring methods may be implemented in software as a set of instructions to be carried out using the processor and an associated volatile and/or non-volatile memory structure.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A method for grading of a test taker's responses to constructed response questions, comprising in combination:
   grading a proper subset of the test taker's responses to the constructed response questions, wherein the proper subset comprises previously ungraded responses;
   calculating a score for the proper subset of the responses;
   calculating a probability that the score is within a predetermined range of what the score would be if all the test taker's responses were graded;
   determining that the probability is greater than a threshold value; and
   discontinuing grading of the test taker's responses in response to the determination that the probability is greater than the threshold value, wherein at least one of the test taker's responses remains ungraded after grading is discontinued, wherein at least the steps of calculating a probability and determining that the probability is greater than a threshold are performed by a processor and an associated memory, and wherein the memory stores instructions for carrying out the steps of calculating a probability and determining that the probability is greater than a threshold.

2. The method of claim 1, wherein the step of calculating the probability includes computing a variance of the score.

3. The method of claim 1, wherein at least one evaluator grades the proper subset of the test taker's responses to the constructed response questions.

4. The method of claim 1, wherein multiple evaluators grade at least one of the test taker's responses to the constructed response questions.

5. A method for grading of responses prepared by a test taker to constructed response questions in an examination, comprising in combination:
   grading a proper subset of the test taker's responses to the constructed response questions in the examination, wherein the proper subset comprises previously ungraded responses;
   calculating a score for the proper subset of the responses;
   calculating a probability that the test taker will pass the examination;
   determining that the probability is outside a threshold range; and
   discontinuing grading of the test taker's responses in response to the determination that the probability is outside the threshold range, wherein at least one of the test taker's responses remains ungraded after grading is discontinued, wherein at least the steps of calculating a probability and determining that the probability is outside a threshold range are performed by a processor and an associated memory, and wherein the memory stores instructions for carrying out the steps of calculating a probability and determining that the probability is outside a threshold range.

6. The method of claim 5, wherein the step of calculating the probability includes calculating an average of grades.

7. The method of claim 5, wherein the threshold range is centered at a score representing fifty percent.

8. The method of claim 5, wherein a least one evaluator grades the proper subset of the test taker's responses to the constructed response questions.

9. The method of claim 5, wherein multiple evaluators grade the proper subset of the test taker's responses to the constructed response questions.

10. A method for grading of a test taker's responses to constructed response questions, comprising in combination:

grading a proper subset of the test taker's responses to the constructed response questions wherein the proper subset comprises previously ungraded responses;

calculating a score for the subset of the responses;

calculating an error estimate of the calculated score;

determining that the error estimate is less than a threshold value; and discontinuing grading of the test taker's responses in response to the determination that the error estimate is less than the threshold value, wherein at least one of the test taker's responses remains ungraded after grading is discontinued, wherein at least the steps of calculating an error estimate and determining that the error estimate is less than a threshold value are performed by a processor and an associated memory, and wherein the memory stores instructions for carrying out the steps of calculating an error estimate and determining that the error estimate is less than a threshold value.

11. The method of claim 10, wherein the step of calculating the error estimate includes calculating a standard deviation of the calculated score.

12. The method of claim 10, wherein at least one evaluator grades the subset of the test taker's responses to the constructed response questions.

* * * * *

UNITED STATES PATENT AND TRADEMARK OFFICE
CERTIFICATE OF CORRECTION

PATENT NO. : 7,657,220 B2  Page 1 of 1
APPLICATION NO. : 10/851405
DATED : February 2, 2010
INVENTOR(S) : Townshend et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1539 days.

Signed and Sealed this

Thirtieth Day of November, 2010

David J. Kappos
*Director of the United States Patent and Trademark Office*